(12) United States Patent
Nagelsdiek et al.

(10) Patent No.: US 8,153,722 B2
(45) Date of Patent: Apr. 10, 2012

(54) CURABLE POLYMER CONCRETE MIXTURE

(75) Inventors: René Nagelsdiek, Hamminkeln (DE); Wolfgang Pritschins, Wesel (DE); Bernd Göbelt, Wesel (DE); Dorothée Greefrath, Mülheim an der Ruhr (DE); Stephan Remme, Kamp-Lintfort (DE); Andrea Esser, Wesel (DE)

(73) Assignee: BYK-Chemie GmbH, Wesel (DE)

( * ) Notice: Subject to any disclaimer, the term of this patent is extended or adjusted under 35 U.S.C. 154(b) by 35 days.

(21) Appl. No.: 12/548,821

(22) Filed: Aug. 27, 2009

(65) Prior Publication Data

US 2010/0016492 A1    Jan. 21, 2010

Related U.S. Application Data

(63) Continuation of application No. PCT/EP2008/001534, filed on Feb. 27, 2008.

(30) Foreign Application Priority Data

Feb. 27, 2007   (DE) .......................... 10 2007 009 754

(51) Int. Cl.
   *C08L 83/00* (2006.01)
(52) U.S. Cl. ........ 524/506; 524/114; 524/197; 524/188; 524/262
(58) Field of Classification Search .................. 524/188, 524/506, 114, 197, 262
   See application file for complete search history.

(56) References Cited

U.S. PATENT DOCUMENTS

| | | | |
|---|---|---|---|
| 3,681,287 A | 8/1972 | Brown et al. | |
| 4,626,567 A | 12/1986 | Chang | |
| 4,650,889 A | 3/1987 | Plueddemann | |
| 6,514,584 B1 * | 2/2003 | Merlin et al. | 428/36.7 |
| 2006/0276348 A1 | 12/2006 | Cowan | |

FOREIGN PATENT DOCUMENTS

| | | |
|---|---|---|
| DE | 2844740 A1 | 4/1979 |
| DE | 69018397 T2 | 10/1995 |
| EP | 0224122 A2 | 6/1987 |
| EP | 0451709 A2 | 10/1991 |
| EP | 0930279 A1 | 7/1999 |
| EP | 1236459 A1 | 9/2002 |
| JP | 62275048 A | 11/1987 |
| WO | 98/28307 A1 | 7/1998 |

OTHER PUBLICATIONS

Aakzo Nobel Organische Peroxide für die UP-Harz-Verarbeitung, Produktübersicht.
Egbert Brandau, "Duroplastwerkstoffe" VCH Verlagsgesellschaft mbH, D-6940 Weinheim (Bundesrepublik Deutschland), 1993.
J.H. Aurer, A. Kasper "Unsaturated Polyster Resins", Verlag Modeme Insustrie, Landsberg-Lech, 2003.
Pergan GmbH, Catalysts, Accelerators and other Additives for Curing Unsaturated Polyester Resin.
G. Kannebley et al., AVK-TV-Handbuch, Band I and II, Frankfurt 2004.
Ekkehard Muh, et al., "Bismethacrylate-Based Hybrid Monomers via Michael-Addition Reactions", American Chemical Society, Macromolecules 2001, vol. 34, pp. 5778-5785.
Robert Burns, "Polyester Molding Compounds", Plastics Engineering, 1982.
Curing of Unsaturated Polyester Resins, Arkema, www.luperox.com. Jun. 2006.

* cited by examiner

*Primary Examiner* — Peter D Mulcahy
(74) *Attorney, Agent, or Firm* — Norris McLaughlin & Marcus PA

(57) ABSTRACT

A curable polymer mixture comprising 1.) at least one at least oligomeric addition product a) of at least one amino silane and/or thiosilane having at least one hydrolysable silane group to at least one compound having at least two terminal, ethylenically unsaturated double bonds, and/or at least one at least oligomeric addition product b) of at least one isocyanate silane and/or epoxy silane having at least one hydrolysable silane group to at least one oligomeric compound having at least three recurring units and at least one terminal hydroxyl group or terminal amino group and at least one terminal ethylenically unsaturated double bond as coupling additive, 2.) a system which can be cured by radical polymerization, comprising at least one ethylenically unsaturated polymer and/or a (meth)acrylic resin, at least one ethylenically unsaturated monomer, at least one radical initiator and optionally at least one cross-linking agent as binder 3.), at least 20% by weight, preferably at least 40% by weight, more preferably at least 60% by weight, based on the total weight of the components 1.) to 4.) of the polymer mixture, of inorganic, preferably multiparticulate, fillers as aggregates, and 4.) optionally conventional auxiliaries.

26 Claims, No Drawings

US 8,153,722 B2

CURABLE POLYMER CONCRETE MIXTURE

This application is a continuation of International Application Serial No. PCT/EP2008/001534, filed Feb. 27, 2008, claiming the priority of German Application Serial No. 10 2007 009 754.0, now pending.

BACKGROUND OF THE INVENTION

The present invention relates to a curable polymer mixture, preferably a curable polymer concrete mixture comprising 1.) as coupling additive at least one at least oligomeric addition product a) of at least one amino silane and/or thiosilane having at least one hydrolysable silane group and at least one compound having at least two terminal, ethylenically unsaturated double bonds and/or at least one at least oligomeric addition product b) of at least one isocyanate silane and/or epoxy silane having at least one hydrolysable silane group and at least one oligomeric compound with at least three structured units and having at least one terminal hydroxy group or terminal amino group and at least one terminal ethylenically unsaturated double bond, 2.) a system which can be cured by radical polymerisation and comprises at least one ethylenically unsaturated polymer and/or a (meth)acrylic resin, at least one ethylenically unsaturated monomer, at least one radical initiator and optionally at least one cross-linking agent as binder 3.), at least 20% by weight, preferably at least 40% by weight, more preferably at least 60% by weight, based on the total weight of the compounds 1.) to 4.) of the polymer mixture, of inorganic, preferably multiparticulate, fillers as aggregates and 4.) optionally conventional auxiliaries.

Curable polymer mixtures of different compositions have various applications, such as for the production of polymer concrete.

Polymer concretes are known materials which, unlike normal concrete, have a polymer as binder which holds the rock grains, what are known as aggregates, together. The aggregates can have the most varied rock grain size and are usually used ranging from the finest to a coarse grain size. Depending on the mixture of the various grain sizes, this allows filling degrees of up to 95% by weight. Ethylenically unsaturated polymers are preferably used as polymeric binders in order to produce polymer concretes by curing polymer matrix in which the aggregates are distributed. It is important for the quality of a polymer concrete that it has outstanding mechanical properties, such as flexural strength, tensile strength, compressive strength and impact strength, in addition to an adequate E modulus, which are only obtained by a very effective interaction, i.e. adhesion, between the polymer matrix and the aggregates which are joined by the polymer matrix. The more effective this interaction, the higher the quality of the polymer concrete. This also applies to other curable polymer mixtures with, in particular, a high filling degree. Moreover, it is of crucial significance that the polymer concrete mixture which has not yet cured spreads rapidly, i.e. it has an excellent slump which can be achieved, inter alia, by a sufficiently low viscosity of the polymer mixture. In spite of an excellent slump, a rapid curing of the polymer mixture to be cured should, however, also be possible.

The known polymer concrete mixtures do not have the aforementioned desirable processing properties or the polymer concretes obtained therefrom do not always exhibit satisfactory values in the aforementioned mechanical properties for many fields of application.

An object of the present invention was therefore to provide curable polymer mixtures, preferably curable polymer concrete mixtures which, due to their low viscosity, ensure an improved processing, i.e. an increased slump, and the cured polymer compositions produced therefrom, preferably the polymer concretes, have improved mechanical properties compared to the previously known products.

SUMMARY OF THE INVENTION

This object is achieved by providing the inventive, curable polymer, preferably the inventive curable polymer concrete mixture, which comprises 1.) as coupling additive at least one at least oligomeric addition product a) of at least one amino silane and/or thiosilane having at least one hydrolysable silane group to at least one compound having at least two terminal, ethylenically unsaturated double bonds as the only end groups and/or at least one at least oligomeric addition product b) of at least one isocyanate silane and/or epoxy silane having at least one hydrolysable silane group to at least one oligomeric compound with three recurring structural units and having at least one terminal hydroxy group or terminal amino group and at least one terminal ethylenically unsaturated double bond, 2.) a system which can be cured by radical polymerisation and comprises at least one ethylenically unsaturated polymer and/or a (meth)acrylic resin, at least one ethylenically unsaturated monomer, at least one radical initiator and optionally at least one cross-linking agent as binder, 3.) at least 20% by weight, preferably at least 40% by weight, most preferably at least 60% by weight, in particular up to 95% by weight, based on the total weight of the compounds 1.) to 4.) of the polymer mixture, of inorganic, preferably multiparticulate, fillers as aggregates and 4.) optionally conventional auxiliaries.

Addition products are already known from the state of art which have at least one hydrolysable silane group and a terminal ethylenically unsaturated double bond as monomers in formulations for dental fillings with a low shrinkage behaviour (Macromolecules 2001, 34, 5778-5785).

Furthermore in the disclosure of U.S. Pat. No. 4,650,889 the use of alkoxy silanes, which have unsaturated double bonds as terminal groups, in unsaturated polyester systems for improving the flexibility of glass fibre mats impregnated therewith is cited.

Neither the improved processability of the inventive polymer mixtures, in particular polymer concrete mixtures, nor the outstanding mechanical properties of the products, such as a polymer concrete, obtained thereof is suggested in or could be expected by knowing the state of the art.

DETAILED DESCRIPTION

As coupling additive 1.) preferably an addition products having at least one hydrolysable silane group and at least one terminal ethylenically unsaturated double bond are used in the curable, inventive polymer mixtures, preferably in the curable polymer concrete mixtures.

Preferably as oligomeric, more preferably polymeric coupling additive a) at least one oligomeric, preferably polymeric addition product of at least one amino silane and/or thiosilane having at least one hydrolysable silane group to at least one compound having at least two terminal ethylenically unsaturated double bonds as only terminal groups, and/or b) at least one oligomeric, preferably polymeric addition product of at least one isocyanate silane and/or epoxy silane having at least one hydrolysable silane group with at least one oligomeric, preferably polymeric compound having at least one terminal hydroxy group or terminal amino group and at least one terminal ethylenically unsaturated double bond are used.

Preferably as compounds, which have at least one hydrolysable silane group, compounds of the general formula

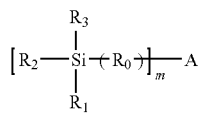

can be used, in which formula

A represents an epoxide group, a glycidyloxy group, an isocyanate group, an —SH group, or an —N(H)—X group, wherein X represents hydrogen, an alkyl radical having 1 to 6 carbon atoms, an aryl radical having 6 to 10 carbon atoms or a cycloalkyl radical having 4 to 6 carbon atoms, it being possible for each of these X radicals to be substituted by a primary or secondary amino group, or A represents a bond when m is the integer 2, $R_0$ represents an alkylene radical having 1 to 12 carbon atoms, a cycloalkylene radical having 4 to 6 carbon atoms or an arylene radical having 6 to 10 carbon atoms, $R_1$ represents an alkyl radical having 1 to 3 carbon atoms, a halogen, an —O—C(=O)—$R_4$ group or an —O$R_4$ group, wherein $R_4$ represents hydrogen or an alkyl radical having 1 to 3 carbon atoms, $R_2$ represents an alkyl radical having 1 to 3 carbon atoms, an —O—C(=O)—$R_4$ group, a halogen or an —O$R_4$ group, wherein $R_4$ represents hydrogen or an alkyl radical having 1 to 3 carbon atoms, $R_3$ represents an —O—C(=O)—$R_4$ group, a halogen or an —O$R_4$ group, wherein $R_4$ represents an alkyl radical having 1 to 3 carbon atoms, and m represents an integer 1 or 2.

Preferably as an amino silane having at least one hydrolysable silane group at least one compound selected from the group comprising 3-(N-allylamino)propyltrimethoxysilane, 4-aminobutyltriethoxysilane, 1-amino-2-(dimethylethoxysilyl)propane, N-(2-aminoethyl)-3-aminoisobutyldimethylmethoxysilane, N-(2-aminoethyl)-3-aminoisobutyl-methyldimethoxysilane, (aminoethylaminomethyl) phenethyltrimethoxysilane, N-(2-aminoethyl)-3-aminopropylmethyldimethoxysilane, N-(2-aminoethyl)-3-aminopropyltriethoxysilane, N-(2-aminoethyl)-3-aminopropyltrimethoxysilane, N-(6-aminohexyl) aminomethyltrimethoxysilane, N-(6-aminohexyl) aminopropyltrimeth-oxysilane, N-(2-aminoethyl)-11-aminoundecyltrimethoxysilane, 3-(m-aminophenoxy) propyltrimethoxysilane, m-aminophenyltrimethoxysilane, p-aminophenyltrimethoxysilane, N-3-[amino(polypropyleneoxy)]aminopropyltrimethoxysilane, 3-aminopropyldiisopropyleth-oxysilane, 3-aminopropyldimethylethoxysilane, 3-aminopropylmethyldiethoxysilane, 3-aminopropyltriethoxysilane, 3-aminopropyltrimethoxysilane, 11-aminoundecyltriethoxysilane, bis(2-hydroxyethyl)-3-aminopropyltriethoxysilane, bis(methyldiethoxysilylpropyl)amine, bis (triethoxysilylpropyl)amine, bis(trimethoxysilylpropyl) amine, bis[(3-trimethoxysilyl)propyl]ethylenediamine, bis (3-trimethoxysilylpropyl)-N-methylamine, n-butylaminopropyltrimethoxysilane, t-butylaminopropyltrimethoxysilane, N-cyclohexylaminopropyltrimethoxysilane, 3-(2,4-dinitrophenylamino)propyltriethoxysilane, N-ethylaminoisobutylmethyldiethoxysilane, N-ethylaminoisobutyltrimethoxysilane, N-(3-methacryloxy-2-hydroxypropyl)-3-aminopropyltriethoxysilane, N-methylaminopropylmethyldimethoxysilane, N-methylaminopropyltrimethoxysilane, N-phenylaminomethyltriethoxysilane, N-phenylaminomethyltrimethoxysilane, 3-(N-styrylmethyl-2-aminoethylamino)propyltrimethoxysilane, (3-trimethoxysilylpropyl)diethylenetriamine, (3-triethoxysilylpropyl)diethylenetriamine, N-cyclohexylaminomethylmethyldiethoxysilane, N-cyclohexylaminomethyltriethoxysilane, N-phenylaminomethyltriethoxysilane and mixtures thereof can be used.

At least one compound selected from the group comprising mercaptomethylmethyldiethoxysilane, 3-mercaptopropylmethyldimethoxysilane, 3-mercaptopropyltriethoxysilane, 3-mercaptopropyltrimethoxysilane and mixtures thereof can be used as a thiosilane having at least one hydrolysable silane group.

At least one compound selected from the group comprising 3-isocyanatopropyldimethylchlorosilane, 3-isocyanopropyltriethoxysilane, 3-isocyanatopropyltrimethoxysilane, (isocyanatomethyl)methyldimethoxysilane and mixtures thereof can be used as an isocyanate silane having at least one hydrolysable silane group.

Moreover, at least one compound selected from the group comprising 2-(3,4-epoxycyclohexyl)ethyltriethoxysilane, 2-(3,4-epoxycyclohexyl)ethyltrimethoxysilane, 5,6-epoxyhexyltriethoxysilane, 5,6-epoxyhexyltrimethoxysilane, 5,6-epoxyhexylmethyldimethoxysilane, 5,6-epoxyhexylmethyldiethoxysilane, 5,6-epoxyhexyldimethylethoxysilane, 5,6-epoxyhexyldimethylmethoxysilane, (3-glycidoxypropyl) dimethylethoxysilane, (3-glycidoxypropyl) dimethylmethoxysilane, (3-glycidoxypropyl) methyldiethoxysilane, (3-glycidoxypropyl) methyldimethoxysilane, (3-glycidoxypropyl) triethoxysilane, (3-glycidoxypropyl)trimethoxysilane and mixtures thereof can be used as an epoxy silane compound having at least one hydrolysable silane group.

Preferably suitable as reaction compounds for the amino silanes and/or thiosilanes having at least one hydrolysable silane group are at least oligomeric compounds which have terminal ethylenically unsaturated double bonds as only terminal groups, whereby these terminal double bonds can be derived from an acrylate, methacrylate and/or allyl group. These compounds with terminal ethylenically unsaturated double bonds, are preferably polymeric compounds, which are more preferably selected from the group comprising polyethers, polyesters, polyesterpolyethers, polyamides, polyesteramides, whereby according to the invention polycarbonates are also defined as polyesters, with the respective terminal groups.

Compounds with the recurring structural unit

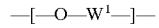

are suitable as polyethers, where $W^1$ is an aliphatic radical having 1 to 15 carbon atoms, preferably 2 to 8 carbon atoms, more preferably 2 to 4 carbon atoms, an aromatic or cycloaliphatic ring or an aromatic-aliphatic group. The ether group can also be part of a chain-positioned ring.

Preferred polyethers include polyethylene oxides, polypropylene oxides, polybutylene oxides, polystyrene oxides, ethylene oxide/propylene oxide copolyethers, poly (tetrahydrofurans) which optionally contain bisphenol A units in their main chain, copolyethers of the mentioned polyether units or mixtures of at least two of the mentioned polyethers. Polyethers which are particularly preferred are polyethylene oxides, polypropylene oxides and polyethers from ethylene oxide/propylene oxide. The polyethers preferably have a molecular weight of 100 to 10000 g/mol, more preferably 150 to 7500 g/mol, and most preferably 200 to 3000 g/mol.

Suitable polyesters are preferably saturated polyesters, i.e. polyesters which are not ethylenically unsaturated, such as polyesters of lactones, for example ε-caprolactone and/or δ-valerolactone as well as polyesters obtained by condensation of α,ω-hydroxycarboxylic acids or by condensation of dicarboxylic acids with diols. Either dicarboxylic acids, acid halides thereof, acid anhydrides or esters can be used as acid components; the following dicarboxylic acids are suitable in particular: oxalic acid, malonic acid, dimethylmalonic acid, succinic acid, glutaric acid, adipic acid, trimethyladipic acid, pimelic acid, 2,2-dimethylglutaric acid, azelaic acid, sebacic acid, 1,3-cyclopentane dicarboxylic acid, 1,2-cyclohexane dicarboxylic acid, 1,4-cyclohexane dicarboxylic acid, phthalic acid, terephthalic acid, isophthalic acid, 2,5-norbornane dicarboxylic acid, 1,4-naphthalene dicarboxylic acid, diphenic acid, 4,4'-oxydibenzoic acid, diglycolic acid, thiodipropanoic acid, 4,4'-sulphonyldibenzoic acid, 2.5-naphthalene dicarboxylic acid and tricyclodecane dicarboxylic acid.

Diols suitable for reacting with the saturated dicarboxylic acids comprise ethane diol, 1,2-propane diol, 1,3-propane diol, 1,2-butane diol, 1,4-butane diol, 1,2-pentane diol, 1,4-pentane diol, 2,4-pentane diol, 1,2-hexane diol, 1,5-hexane diol, 1,6-hexane diol, 2,5-hexane diol, 1,7-heptane diol, 1,8-octane diol and neopentyl glycol.

Polyesters which are particularly preferred are poly(ε-caprolactone), poly(δ-valerolactone), caprolactone/valerolactone copolyester, polylactide, polyethylene terephthalate and polybutylene terephthalate.

As polyesters polycarbonates having the recurring structural unit

are also understood. In this structural unit, $W^2$ is an aliphatic radical having 2 to 15 carbon atoms, preferably 2 to 12 carbon atoms, more preferably 2 to 8 carbon atoms or an aromatic or cycloaliphatic radical or an aromatic-aliphatic group, preferably a bisphenol A radical or a radical derived therefrom. The carbonate group can also be part of a chain-positioned ring.

Mixed polyesters of carbonic acid and other acids (polyester-polycarbonates) are also suitable. Preferred polycarbonates comprise polycarbonate based on bisphenol A, polycarbonate based on bisphenol F, polycarbonates based on bisphenol A and bisphenol TMC as well as based on 1,6-hexane diol. According to the invention, the term polyesters also comprises polycarbonates or copolyester carbonates.

Preferred polyesters are polyesters which have a molecular weight of 150 to 15000 g/mol, more preferably 200 to 7500 g/mol and most preferably 250 to 3000 g/mol.

Polyamides which have modified terminal groups and have the recurring structural Unit

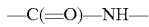

can also be used to prepare the inventive, coupling additives. Monomers for polyamides comprise: ε-caprolactam, aminocaproic acid, oenatholactam, 7-aminoheptanoic acid, 11-aminoundecanoic acid, 9-aminononanoic acid or mixtures thereof. If the polyamide is prepared by polycondensation of a diamine with a dicarboxylic acid, then the following can preferably be used as diamines: tetramethylene diamine, hexamethylene diamine, nonamethylene diamine, decamethylene diamine, undecamethylene diamine, dodecamethylene diamine, para-aminoaniline or meta-xylene diamine, and the following can preferably be used as dicarboxylic acids: adipic acid, sebacic acid, dodecanedioic acid, glutaric acid, terephthalic acid, 2-methylterephthalic acid, isophthalic acid, dimeric acid and naphthalene dicarboxylic acid.

In addition to dicarboxylic acids or diamines, it is also possible to use polyfunctional compounds, such as trimellitic acid and pyromellitic acid which have three or more functional groups, in a quantity up of to 5 mol %.

Preferred polyamides are those with a molecular weight of 150 to 15000 g/mol, more preferably 200 to 7500 g/mol and most preferably 250 to 3000 g/mol.

Polyamides which are particularly preferred are derived from nylon 6, nylon 7, nylon 8, nylon 10, nylon 2, nylon 66, nylon 69, nylon 610, nylon 611, nylon 612, nylon 6T, nylon 6/66, nylon 6/12 and nylon 6/6T.

Polyesteramides with the aforementioned recurring structural units can also be used.

The before mentioned polymers can be of a linear, branched or star-like construction. It is possible to obtain branched or stellate polymers by using suitable multifunctional starting compounds.

Oligomeric or polymeric compounds which are particularly preferred comprise polyethylene oxides, polypropylene oxides, ethers of ethylene oxide/propylene oxide as well as (poly)ε-caprolactone esters and esters derived from adipic acid and a diol.

The mentioned oligomeric or polymeric compounds having the above mentioned modified terminal groups are preferably polydisperse, i.e. they do not have a uniform chain length and are also used in a polydisperse manner for the reaction with the above mentioned silane compounds.

The above mentioned oligomeric or polymeric compounds have besides other terminal functional groups at least one terminal double bond or only at least two terminal double bonds, preferably derived from acrylic acid or methacrylic acid, preferably from acrylic acid. This (these) ethylenically unsaturated terminal double bond(s) can either be obtained by respectively reacting the mentioned oligomers or polymers with acrylic acid, methacrylic acid or derivatives thereof or by using a suitable initiator compound, derived from (meth) acrylic acid, such as a hydroxyfunctional (meth)acrylic ester which is then incorporated and present as a terminal group of the oligomeric or polymeric compound after polymerisation.

The oligomeric or polymeric compounds used for the reaction with the aminosilanes or thiosilanes preferably have at least two terminal ethylenically unsaturated double bonds, 5 to 95 mol %, preferably 10 to 90 mol % and more preferably 20 to 80 mol % of these double bonds being reacted during the reaction with the aminosilanes or thiosilanes.

In order to prepare the coupling additive 1.) b) the aforementioned oligomeric or polymeric compounds having at least one terminal ethylenically unsaturated double bond and at least one hydroxyl group or amino group are reacted with isocyanate silanes or epoxy silanes which have at least one hydrolysable silane group.

More than 50 mol %, preferably more than 75 mol % and more preferably more than 95 mol % of the hydroxyl or amino end groups or corresponding derivatives are preferably reacted with the isocyanate group and/or epoxy group of the respective silanes.

The relevant reaction conditions which are to be observed, are known to a person skilled in the art.

The curable polymer mixture according to the invention, preferably the curable polymer concrete mixture, preferably contains less than 5% by weight, more preferably less than 1% by weight, most preferably less than 0.5% by weight, based on the total weight of the compounds 1.) to 4.) of the polymer mixture, of at least one of the coupling additives 1.) a) and/or 1.) b) described before.

As a system which can be cured by radical polymerisation and which is used as binder component 2.) in the inventive curable polymer mixture, a system comprising at least one ethylenically unsaturated polymer and/or a (meth)acrylic resin is used together with at least one ethylenically unsaturated monomer, at least one radical initiator and optionally at least one cross-linking agent component.

Preferably as ethylenically unsaturated synthetic resin component an ethylenically unsaturated synthetic resin, most preferably an ethylenically unsaturated polyester resin, obtained by reacting an ethylenically unsaturated dicarboxylic acids with diols, optionally together with saturated carboxylic acids or (di)cyclopentadiene, is used and as described, for example, in "Duroplastwerkstoffe" by E. Brandau, V C H Verlagsgesellschaft, Weinheim 1993 and in "Unsaturated Polyester Resins" by J. H. Aurer, A. Kasper, Verlag Moderne Industrie, Landsberg/Lech 2003 and also in "AVK-TV Handbuch" by G. Kannebley et al., volumes 1 and II, Frankfurt 2004.

Particularly preferred ethylenically unsaturated dicarboxylic acids or derivatives thereof used for the preparation of unsaturated synthetic resins are maleic acid and fumaric acid as well as maleic aid anhydride. However, it is also possible to use in addition bifunctional saturated carboxylic acid such as adipic acid, tetrahydrophthalic acid, phthalic acid, isophthalic acid, terephthalic acid, HET acid (hexachloro-endomethylene-tetrahydrophthalic acid) and glutaric acid as well as the anhydrides of these carboxylic acids or Diels-Alder adducts from maleic acid anhydride and cyclopentadiene. In addition acrylic acid and methacrylic acid can also be used in the production of unsaturated polyester resins. For the polycondensation bifunctional alcohols such as propylene, dipropylene, ethylene, diethylene and/or neopentyl glycol, as well as 1,4-butane diol, 1,6-hexane diol, alkoxylated bisphenol A and 2,2,4-trimethylpentane-1,3-diol can be used.

In addition to the dicarboxylic acids and diols, higher-functional carboxylic acids and alcohols can also be used in order to obtain branched polycondensation products.

As a further or alternative synthetic resin curable by radical polymerisation, (meth)acrylic resins, such as poly(meth)acrylates, poly(meth)acrylamides, copolymers from (meth)acrylates/(meth)acrylamides can be used, optionally together with at least one of the following known cross-linking agents preferably di-, tri- and higher functional (meth)acrylates, for example ethyleneglycoldi(meth)acrylate, propyleneglycoldi(meth)acrylate, 1,4-butanedioldi(meth)acrylate, 1,6-hexanedioldi(meth)acrylate, diethyleneglycoldi(meth)acrylate, dipropyleneglycoldi(meth)acrylate, glyceroltri(meth)acrylate, trimethylolpropanetri(meth)acrylate, triethyleneglycoldi(meth)acrylate, tripropyleneglycoldi(meth)acrylate, preferably in quantities of up to 7.5% by weight, preferably up to 5% by weight, based on the total weight of binder component 2.). Binder component 2.) also contains at least one ethylenically unsaturated monomer, preferably optionally substituted styrenes, (meth)acrylates, (meth)acrylamides or mixtures thereof, preferably in a quantity of up to 55% by weight, more preferably up to 45% by weight, based on the total weight of the binder component 2.)

Furthermore, the curable polymer mixture according to the invention, preferably the curable polymer concrete mixture, is provided with a quantity of at least 20% by weight, preferably at least 40% by weight, most preferably 60% by weight, in particular up to 95% by weight, based on the total weight of the components 1.) to 4.) of the polymer mixture, of distributable inorganic fillers as aggregates. This filler-component 3.) is characterised in that the fillers can be distributed in the matrix materials, i.e. they can be arranged in a multiparticulate manner and are insoluble in the matrix materials.

A list of possible fillers is provided in "Duroplastwerkstoffe" by E. Brandau, V C H Verlagsgesellschaft, Weinheim 1993 as well as in "Polyester Molding Compounds" by R. Burns, Marcel Dekker Inc., New York 1982 and also in "Unsaturated Polyester Resins" by J. H. Aurer, A. Kasper, Verlag Moderne Industrie, Landsberg/Lech 2003.

Preferably as distributable inorganic fillers can be used inorganic, silicon-containing compounds, preferably quartz, cristobalite, pyrogenic silicas, precipitated silicas, wollastonite, kaolin, mica, talcum, preferably as rock grains in all grain size ranges, i.e. from the finest grain size to a coarse rock grain size, silicon-containing compounds in the form of cut fibres as well as other oxygenic inorganic compounds of magnesium, calcium, barium, such as barium sulphate, calcium carbonate, inter alia, also as marble grain, gypsum, magnesium hydroxide and/or inorganic aluminium compounds, preferably aluminium hydroxide, aluminium oxides (for example corundum) and aluminium oxide hydroxides. Compounds containing silicon are more preferably used. The particularly preferred forms of the fillers are granular or pulverulent fillers. The grain size preferably ranges from 1 µm to 5 cm, more preferably 10 µm to 2 cm, most preferably 100 µm to 2 cm in diameter.

At least one radical initiator is usually used for the polymerisation of the binder component 2.). Organic peroxides and azo compounds, preferably organic peroxides are suitable as radical initiators. The radical initiator is preferably selected according to the curing temperature. Preferably used as radical initiators are methylethylketone peroxide, dibenzoyl peroxide, lauryl peroxide, dicumyl peroxide, cumenehydro peroxide, t-butylperbenzoate, 1,1-di-(t-butylperoxy)-3,3,5-trimethylcyclohexane. Further suitable radical initiators are known in principle to a person skilled in the art. Moreover, they are disclosed in the state of the art like in brochures, inter alia, such as "Organische Peroxide für die UP-Harz-Verarbeitung: Produktübersicht" (by Akzo Nobel), "Luperox Organic Peroxides—Curing of unsaturated polyester resins" (by elf-atochem) and "Härter, Beschleuniger und andere Hilfsstoffe für die Verarbeitung von UP-Harzen" (by Pergan GmbH).

Depending on the curing conditions, a conventional accelerator can optionally used additionally to enable a radical polymerisation and curing of the binder component 2.) even at relatively low temperatures, i.e. without the external supply of heat. Conventional accelerators comprise compounds containing amino groups, preferably tertiary amines, such as triethylamine, tridimethylaminophenylphenol, benzyldimethylamine, dimethylaniline, diethylaniline, dimethyl-p-toluidine, cobalt compounds such as cobalt ethylhexanoate, vanadium octoate and/or other metal carboxylates. Conventional accelerators are also mentioned in the brochure "Härter, Beschleuniger und andere Hilfsstoffe für die Verarbeitung von UP-Harzen" (Pergan GmbH). A combination of amine and metal compounds can also be used as an accelerator system.

The quantities which are used in each case of a radical initiator and of an optionally present accelerator system are known to a person skilled in the art.

Moreover, the curable polymer mixture according to the invention can contain, if necessary, processing additives such as release agents and antifoam agents, inhibitors, stabilisers, such as antioxidants, light stabilisers, heat stabilisers and flameproofing agents, modifiers such as wetting agents, plasticisers, thickeners, thixotroping agents, impact strengthening agents and blowing agents and/or surface modifiers, such as antistatic agents, pigments, wetting and dispersing agents as component 4.). The corresponding additives are selected in a known manner depending on the end purpose of use.

The curable polymer mixture according to the invention, preferably curable polymer concrete mixtures are prepared in a known manner, by mixing the mentioned components by means of conventional mixing units, the coupling additive 1.) preferably being added immediately before the polymer mixture is processed and cured.

As a result of using the coupling additive component 1.) used according to the invention and as described above, and as a result of using the described binder system 2.), it is possible to provide curable polymer mixtures, preferably curable polymer concrete mixtures, which can be handled better due to their improved slump and to produce plastic products thereof, preferably polymer concretes, which have excellent mechanical properties.

A further object of the present invention is therefore also the use of the addition products 1.) a) and/or 1.) b) described above which have at least one hydrolysable silane group and at least one terminal ethylenically unsaturated double bond as coupling additive in curable, polymerisable mixtures, based on a system 2.) which can be cured by radical polymerisation as described above which is provided with at least 20% by weight, preferably at least 40% by weight, most preferably at least 60% by weight, based on the total weight of the components 1.) to 4.) of the polymer mixture, of distributable, inorganic fillers as additives 3.) and optionally contains conventional auxiliaries 4.), preferable for the preparation of the inventive curable polymer mixture, preferable curable polymer concrete mixtures according to the invention.

The citations of % by weight in the present application concerning the components 1.) to 4.) have to be interpreted that the total amount of these components 1.) to 4.) is always 100% by weight.

These polymer mixtures obtained can be cured in a manner known per se by polymerisation of the ethylenically unsaturated compounds and optionally by using a cross-linking agent, as described in "Unsaturated Polyester Resins" by J. H. Aurer, A. Kasper, Verlag Moderne Industrie, Landsberg/Lech 2003 and in "AVK-TV Handbuch" by G. Kannebley et al., volumes I and II, Frankfurt 2004. The corresponding description is hereby introduced as part of the disclosure of the present application.

The curing process of the inventive polymer mixture is determined by the nature of the polymer system used, the cure time, the temperature and the mass of the total system to be cured. Curing can be carried out at room temperature as the start temperature without the supply of thermal energy; the aforementioned accelerators are used during this reaction procedure. The exothermic reaction leads to a rise in temperature. During this process, the course of curing can be ascertained by determining the residual monomer content in the forming polymeric end product, like forming polymer concrete. For specific applications, for example in the case of foodstuff contact, it is appropriate to reduce a possible residual monomer content to a minimum. For this purpose, a post-curing process is preferably carried out, wherein the cured polymer mixture is held at an elevated temperature for several hours so that the monomers which can be present are still polymerised. Typical post-curing conditions are temperatures ranging from 60 to 100° C. over periods of 6 to 24 hours.

Alternatively, the polymer system can also be cured with an external supply of energy at start temperatures of above 25° C., for example at temperatures of 100 to 160° C. Energy can be introduced from outside in different ways, inter alia also by the application of pressure.

A further object of the present invention are therefore also cured polymer mixtures obtainable from inventive curable polymer mixtures, preferable cured polymer concretes obtainable from inventive curable polymer concrete mixtures.

From the polymer concrete mixture according to the invention, it is possible to produce preferable moulded articles such as pipes, gutters, manholes, connecting pieces, segmented building components, boards, tiles, floors, floor coverings, linings, walls, ceilings, artificial marble, frames, a wide variety of tanks (for example for infeed water and waste water), decoration articles, sinks, basins, baths and troughs. The polymer concrete mixtures according to the invention can be used to produce articles inside buildings as well as outdoors, and also in the ground. Formed articles can be used, for example in housing spaces, offices, in store construction, in sanitary facilities, in kitchens, hairdresser's shops, medical practices, hospitals, airports, laboratories, in catering or in agriculture.

EXAMPLES

The following reaction components are used in the examples:

| Name | Structure |
| --- | --- |
| diacrylate A | polyethylene glycol 200-diacrylate |
| diacrylate B | polyethylene glycol 400-diacrylate |
| diacrylate C | diacrylate of ethoxylated bisphenol A, 10 recurring units of ethylene oxide |
| diacrylate D | polyethylene glycol diacrylate, 9 recurring units of ethylene oxide |
| diacrylate E | polypropylene glycol diacrylate, 9 recurring units of propylene oxide |
| monoacrylate F | OH terminated polyester monoacrylate (polyester based on 2 recurring units of ε-caprolactone) |

I Preparation of the Coupling Additives

The coupling additives can optionally be prepared in an organic solvent. In the following, the abbreviation GPC stands for gel permeation chromatography, NMR stands for nuclear magnetic resonance spectroscopy, $M_n$ stands for number average molecular weight and PDI stands for polydispersity (i.e. the quotient $M_w/M_n$ from weight average and number average molecular weight).

Coupling Additive 1:

60.00 g (76.9 mmol, based on molecular weight according to NMR spectroscopy) of diacrylate C (GPC: $M_n$=1100, PDI=1.08) are introduced into a round-bottom flask with reflux cooler, gas inlet, temperature sensor, dropping funnel and KPG stirrer. The reaction is carried out under a stream of nitrogen. 10.23 g (46.2 mmol) of 3-aminopropyltriethoxysilane are added dropwise within a period of 10 minutes, the temperature not exceeding 26° C. The mixture is stirred for 6 hours. Product: $M_n$=1300, PDI=1.28, 2.2 mol of acrylate groups per mol of silane groups (determined by $^1$H-NMR spectroscopy).

Coupling Additive 2:

60.00 g (76.9 mmol, based on molecular weight according to NMR spectroscopy) of diacrylate C (GPC: $M_n$=1100, PDI=1.08) are introduced into a round-bottom flask with reflux cooler, gas inlet, temperature sensor, dropping funnel and KPG stirrer. The reaction is carried out under a stream of nitrogen. 5.12 g (23.1 mmol) of 3-aminopropyltriethoxysilane are added dropwise within a period of 8 minutes, the temperature not exceeding 24° C. The mixture is stirred for 6 hours. Product: $M_n$=1100, PDI=1.19, 5.4 mol of acrylate groups per mol of silane groups (determined by $^1$H-NMR spectroscopy).

Coupling Additive 3:

20.00 g (25.6 mmol, based on molecular weight according to NMR spectroscopy) of diacrylate C (GPC: $M_n$=1100, PDI=1.08) are introduced into a sealable screw lid jar with a magnetic stirrer core. 3.41 g (15.4 mmol) of 3-aminopropyltriethoxysilane are added all at once. The mixture is stirred for 6 hours in the sealed vessel. Product: $M_n$=1300, PDI=1.28, 2.2 mol of acrylate groups per mol of silane groups (determined by $^1$H-NMR spectroscopy).

Coupling Additive 4:

10.00 g (19.1 mmol, based on the molecular weight according to NMR spectroscopy) of diacrylate D (GPC: $M_n$=670, PDI=1.09) are introduced into a sealable screw lid jar with a magnetic stirrer core. 2.54 g (11.5 mmol) of 3-aminopropyltriethoxysilane are added all at once. The mixture is stirred for 6 hours in the sealed vessel. Product: $M_n$=1900, PDI=3.51, 1.6 mol of acrylate groups per mol of silane groups (determined by $^1$H-NMR spectroscopy).

Coupling Additive 5:

60.00 g (185.2 mmol, based on molecular weight according to NMR spectroscopy) of diacrylate A (GPC: $M_n$=400, PDI=1.12) are introduced into a round-bottom flask with reflux cooler, gas inlet, temperature sensor, dropping funnel and KPG stirrer. The reaction is carried out under a stream of nitrogen. 24.60 g (111.1 mmol) of 3-aminopropyltriethoxysilane are added dropwise within a period of 10 minutes, the temperature not exceeding 28° C. The mixture is stirred for 8 hours. Product: $M_n$=930, PDI=1.90, 2.1 mol of acrylate groups per mol of silane groups (determined by $^1$H-NMR spectroscopy).

Coupling Additive 6:

60.00 g (114.8 mmol, based on the molecular weight according to NMR spectroscopy) of diacrylate B (GPC: $M_n$=710, PDI=1.10) are introduced into a round-bottom flask with reflux cooler, gas inlet, temperature sensor, dropping funnel and KPG stirrer. The reaction is carried out under a stream of nitrogen. 1 5.23 g (68.8 mmol) of 3-aminopropyltriethoxysilane are added dropwise within a period of 10 minutes, the temperature not exceeding 26° C. The mixture is stirred for 7 hours. Product: $M_n$=1300, PDI=1.81, 2.1 mol of acrylate groups per mol of silane groups (determined by $^1$H-NMR spectroscopy).

Coupling Additive 7:

20.00 g (123.5 mmol, based on molecular weight according to NMR spectroscopy) of diacrylate A (GPC: $M_n$=400, PDI=1.12) are introduced into a sealable screw lid jar with a magnetic stirrer core. 4.10 g (18.5 mmol) of 3-aminopropyltriethoxysilane are added all at once. The mixture is stirred for 6 hours in the sealed vessel. Product: $M_n$=640, PDI=1.85, 5.6 mol of acrylate groups per mol of silane groups (determined by $^1$H-NMR spectroscopy).

Coupling Additive 8:

20.00 g (38.3 mmol, based on molecular weight according to NMR spectroscopy) of diacrylate B (GPC: $M_n$=710, PDI=1.10) are introduced into a sealable screw lid jar with a magnetic stirrer core. 2.54 g (11.5 mmol) of 3-aminopropyltriethoxysilane are added all at once. The mixture is stirred for 6 hours in the sealed vessel. Product: $M_n$=980, PDI=1.75, 5.6 mol of acrylate groups per mol of silane groups (determined by $^1$H-NMR spectroscopy).

Coupling Additive 9:

20.00 g (30.9 mmol, based on molecular weight according to NMR spectroscopy) of diacrylate E (GPC: $M_n$=700, PDI=1.09) are introduced into a sealable screw lid jar with a magnetic stirrer core. 4.10 g (18.5 mmol) of 3-aminopropyltriethoxysilane are added all at once. The mixture is stirred for 6 hours in the sealed vessel. Product: $M_n$=1100, PDI=1.60, 4.1 mol of acrylate groups per mol of silane groups (determined by $^1$H-NMR spectroscopy).

Coupling Additive 10:

20.00 g (61.7 mmol, based on molecular weight according to NMR spectroscopy) of diacrylate E (GPC: $M_n$=700, PDI=1.09) are introduced into a sealable screw lid jar with a magnetic stirrer core. 2.05 g (9.3 mmol) of 3-aminopropyltriethoxysilane are added all at once. The mixture is stirred for 6 hours in the sealed vessel. Product: $M_n$=890, PDI=1.51, 10.9 mol of acrylate groups per mol of silane groups (determined by $^1$H-NMR spectroscopy).

Coupling Additive 11:

60.00 g (114.7 mmol, based on molecular weight according to NMR spectroscopy) of diacrylate D (GPC: $M_n$=670, PDI=1.09) are introduced into a round-bottom flask with reflux cooler, gas inlet, temperature sensor, dropping funnel and KPG stirrer. The reaction is carried out under a stream of nitrogen. 12.34 g (68.8 mmol) of 3-aminopropyltriethoxysilane are added dropwise within a period of 10 minutes, the temperature not exceeding 27° C. The mixture is stirred for 6 hours. Product: $M_n$=1200, PDI=2.55, 1.8 mol of acrylate groups per mol of silane groups (determined by $^1$H-NMR spectroscopy).

Coupling Additive 12:

60.00 g (114.7 mmol, based on molecular weight according to NMR spectroscopy) of diacrylate D ($M_n$=670, PDI=1.09) are introduced into a round-bottom flask with reflux cooler, gas inlet, temperature sensor, dropping funnel and KPG stirrer. The reaction is carried out under a stream of nitrogen. 6.17 g (34.4 mmol) of 3-aminopropyltriethoxysilane are added all at once, the temperature not exceeding 25° C. The mixture is stirred for 8 hours. Product: $M_n$=1100, PDI=2.32, 5.2 mol of acrylate groups per mol of silane groups (determined by $^1$H-NMR spectroscopy).

Coupling Additive 13:

60.00 g (114.7 mmol, based on molecular weight according to NMR spectroscopy) of diacrylate D ($M_n$=670, PDI=1.09) are introduced into a round-bottom flask with reflux cooler, gas inlet, temperature sensor, dropping funnel and KPG stirrer. The reaction is carried out under a stream of nitrogen. 13.30 g (68.8 mmol) of 3-(N-methylamino)propyltrimethoxysilane are added dropwise within a period of 12 minutes, the temperature not exceeding 25° C. The mixture is stirred for 6 hours. Product: $M_n$=900, PDI=1.59, 2.4 mol of acrylate groups per mol of silane groups (determined by $^1$H-NMR spectroscopy).

Coupling Additive 14:

20.00 g (61.7 mmol, based on molecular weight according to NMR spectroscopy) of diacrylate A ($M_n$=400, PDI=1.12) and 112.80 g of Dowanol PMA (1-methoxy-2-propylacetate) are introduced into a round-bottom flask with reflux cooler, gas inlet, temperature sensor, dropping funnel and KPG stirrer. The reaction is carried out under a stream of nitrogen. 8.20 g (37.0 mmol) of 3-aminopropyltriethoxysilane are added within a period of 10 minutes, the temperature not exceeding 27° C. The mixture is stirred for 20 hours. Product: $M_n$=430, PDI=1.14, 2.2 mol of acrylate groups per mol of silane groups (determined by $^1$H-NMR spectroscopy).

Coupling Additive 15:

50.00 g (1 92.5 mmol, based on manufacturer information) of monoacrylate F and 0.78 g of dibutyltindilaurate solution (1% in xylene, 0.01 mmol DBTL) are introduced into a round-bottom flask with reflux cooler, gas inlet, temperature sensor, dropping funnel and KPG stirrer. The reaction is carried out under a stream of nitrogen. The reaction mixture is heated to 80° C. 27.90 g (135.9 mmol) of 3-isocyanatopropyltrimethoxysilane are added dropwise within a period of 5 minutes, the temperature rising to 98° C. The temperature is lowered again to 80° C. by cooling. The mixture is further stirred for 2.5 hours at 80° C. Product: the isocyanate groups were completely reacted, terminal hydroxy groups can no longer be detected (determined by $^{13}$C-NMR spectroscopy); the ratio of acrylate double bonds to silane groups is 1.05:1 (determined by $^{1}$H-NMR spectroscopy; theory: 1:1).

II Application of the Coupling Additives

"Parts" stated in the following always relate to parts by weight.

Production of test samples based on a UP resin system

First of all, the unsaturated polyester resin (UP resin) is premixed with the further components mentioned in table 1:

TABLE 1

| Mixture A (system curable by radical polymerisation): | | |
|---|---|---|
| UP resin | Palatal P-04-01 | 100 parts |
| Styrene | | 12 parts |
| Co-accelerator | Accelerator NL-49P | 1.12 parts |

Palatal P-04-01 is an unsaturated standard orthophthalic acid resin, containing maleic acid units, 65% in styrene (manufacturer: DSM Composite Resins). The co-accelerator Accelerator NL-49P consists of cobalt(II)ethylhexanoate, 1% cobalt in aliphatic ester (manufacturer: Akzo Nobel Polymer Chemicals).

The ingredients are weighed in separately and mixed. The mixture A obtained is further processed with the components cited in table 2 in the respective amounts:

TABLE 2

| Mixture A | see Table 1 | 250 parts |
|---|---|---|
| Peroxide (radical initiator) | Butanox M 50 | 2 parts |
| Quartz flour (filler) | Millisil W 3 | 250 parts |
| Quartz sand (filler) | F32 | 500 parts |

Butanox M 50 is methylethylketoneperoxide, 33%, in 63% dimethylphthalate and 4% MEK/water (manufacturer: Akzo Nobel Polymer Chemicals).
Quartz flour Millisil W 3 and quartz sand F32 originate from the company Quarzwerke.

(A) Determining of the Flexural Strength
(Quantities as per Tables 1 and 2)

Example 1

Mixture A is introduced and mixed with peroxide and coupling additive 1 (0.1% by weight with respect to the quantity of filler). The filler is then added and also mixed. This filler/resin mixture is poured into a planar mould. Curing to produce a plate takes place at room temperature for 1 hour. The plate is then stored for 24 hours at 60° C. After curing is complete, samples complying with test standard DIN EN ISO 178 are cut out of the plate. The measured flexural strength is 53.2 N/mm².

Comparative Example 1

No Coupling Additive

Mixture A is introduced and mixed with peroxide. The filler is then added and also mixed. This filler/resin mixture is poured into a planar mould. Curing to produce a plate takes place at room temperature for 1 hour. The plate is then stored for 24 hours at 60° C. After curing is complete, samples complying with test standard DIN EN ISO 178 are cut out of the plate. The measured flexural strength is 39.9 N/mm².

Example 2

Mixture A is introduced and mixed with peroxide and coupling additive 6 (0.1% by weight with respect to the quantity of filler). The filler is then added and also mixed. This filler/resin mixture is poured into a planar mould. Curing to produce a plate takes place at room temperature for 1 hour. The plate is then stored for 24 hours at 60° C. After curing is complete, samples complying with test standard DIN EN ISO 178 are cut out of the plate. The measured flexural strength is 52.5 N/mm².

Comparative Example 2

Coupling Additive with Low Molecular Weight

Mixture A is introduced and mixed with peroxide and 3-methacryloxypropyltrimethoxy silane (0.1% by weight based on the amount of filler). The filler is then added and also mixed. This filler/resin mixture is poured into a planar mould. Curing to produce a plate takes place at room temperature for 1 hour. The plate is then stored for 24 hours at 60° C. After curing is complete, test samples complying with test standard DIN EN ISO 178 are cut out of the plate. The measured flexural strength is 43.1 N/mm².

Example 3

Mixture A is introduced and mixed with peroxide and coupling additive 9 (0.1% by weight with respect to the quantity of filler). The filler is then added and also mixed. This filler/resin mixture is poured into a planar mould. Curing to produce a plate takes place at room temperature for 1 hour. The plate is then stored for 24 hours at 60° C. After curing is complete, samples complying with test standard DIN EN ISO 178 are cut out of the plate. The measured flexural strength is 49.6 N/mm².

(B) Determining of the E Modulus
(Quantities as per Tables 1 and 2)

Example 4

Mixture A is introduced and mixed with peroxide and coupling additive 14 (0.1% by weight of the 20% solution, based on the quantity of filler). The filler is then added and also mixed. This filler/resin mixture is poured into a planar mould. Curing to produce a plate takes place at room temperature for 1 hour. The plate is then stored for 24 hours at 60° C. After curing is complete, samples complying with test standard DIN EN ISO 178 are cut out of the plate. The measured elasticity modulus is 8.3 kN/mm².

Comparative Example 3

No Coupling Additive

Mixture A is introduced and mixed with peroxide. The filler is then added and also mixed. This filler/resin mixture is poured into a planar mould. Curing to produce a plate takes place at room temperature for 1 hour. The plate is then stored for 24 hours at 60° C. After curing is complete, samples complying with test standard DIN EN ISO 178 are cut out of the plate. The measured elasticity modulus is 5.8 kN/mm².

Comparative Example 4

Coupling Additive with Low Molecular Weight

Mixture A is introduced and mixed with peroxide and 3-methacryloxypropyltrimethoxysilane (0.1% by weight based on the amount of filler). The filler is then added and also mixed. This filler/resin mixture is poured into a planar mould. Curing to produce a plate takes place at room temperature for 1 hour. The plate is then stored for 24 hours at 60° C. After curing is complete, samples complying with test standard DIN EN ISO 178 are cut out of the plate. The measured elasticity modulus is 6.2 kN/mm².

(C) Determining of the Impact Strength (Quantities as per Tables 1 and 2)

Example 5

Mixture A is introduced and mixed with peroxide and coupling additive 14 (0.1% by weight of the 20% solution, based on the quantity of filler). The filler is then added and also mixed. This filler/resin mixture is poured into a planar mould. Curing to produce a plate takes place at room temperature for 1 hour. The plate is then stored for 24 hours at 60° C. After curing is complete, samples complying with test standard EN ISO 179 are cut out of the plate. The measured impact strength is 1.957 mJ/mm².

Comparative Example 5

No Coupling Additive

Mixture A is introduced and mixed with peroxide. The filler is then added and also mixed. This filler/resin mixture is poured into a planar mould. Curing to produce a plate takes place at room temperature for 1 hour. The plate is then stored for 24 hours at 60° C. After curing is complete, samples complying with test standard EN ISO 179 are cut out of the plate. The measured impact strength is 1.574 mJ/mm².

(D) Determining of the Viscosity

Example 6

Differing to table 2 100 parts of mixture A (see Table 1) are introduced and mixed with coupling additive 14 (0.5 parts of the 20% solution). 180 parts of quartz flour Millisil W8 (produced by Quarzwerke) are then added and also mixed. The viscosity of the mixture is determined at 41.2 Pa*s using a Brookfield RV viscosimeter (produced by Brookfield GmbH, Lorch) at 23° C. (spindle 6; 5 rpm).

Comparative Example 6

No Coupling Additive 100 parts of mixture A (see Table 1) are introduced. 180 parts of quartz flour Millisil W8 (produced by Quarzwerke) are then added and mixed in. The viscosity of the mixture is determined at 48.2 Pa*s using a Brookfield RV viscosimeter (produced by Brookfield GmbH, Lorch) at 23° C. (spindle 6; 5 rpm).

Comparative Example 7

Coupling Additive with Low Molecular Weight 100 parts of mixture A (see Table 1) are introduced and mixed with 0.5 parts 3-methacryloxypropyltrimethoxysilane as coupling additive. 1 80 parts of quartz flour Millisil W8 (produced by Quarzwerke) are then added and also mixed. The viscosity of the mixture is determined at 48.6 Pa*s using a Brookfield RV viscosimeter (produced by Brookfield GmbH, Lorch) at 23° C. (spindle 6; 5 rpm).

Example 7

Differing to table 2 100 parts of mixture A (see Table 1) are introduced and mixed with coupling additive 14 (1.0 part of the 20% solution). 180 parts of quartz flour Millisil W8 (produced by Quarzwerke) are then added and also mixed. The viscosity of the mixture is determined at 30.8 Pa*s using a Brookfield RV viscosimeter (produced by Brookfield GmbH, Lorch) at 23° C. (spindle 6; 5 rpm).

Comparative Example 8

Low Molecular Weight Coupling Additive 100 parts of mixture A (see Table 1) are introduced and mixed with 1.0 part of 3-methacryloxypropyltrimethoxysilane 180 parts of quartz flour Millisil W8 (produced by Quarzwerke) are then added and also mixed. The viscosity of the mixture is determined at 46.8 Pa*s using a Brookfield RV viscosimeter (produced by Brookfield GmbH, Lorch) at 23° C. (spindle 6; 5 rpm).

(E) Determining of the Slump

The slump test was carried out analogously to DIN 1048, Part 1. Required for carrying out the slump test are a slump table measuring 70 cm×70 cm which is to be stored horizontally and rigidly, a mould and a wooden slat. The mould which is used is cylindrical without a base or cover, with a diameter of 10 cm and a height of 5.5 cm.

The table top and inside surface of the mould are to be wiped clean with a damp cloth. The concrete is trowelled into the mould positioned in the centre of the table top in two approximately identical layers and each layer is levelled horizontally or drawn off level using the wooden slat without a compressive effect. In so doing, the tester stands on the two footboards of the mould. Thereafter, the free surface of the table top is cleaned and the mould is pulled up vertically. The table top is then raised and dropped 15 times within 15 seconds using the handle up to the stop, but without hitting it forcefully. The entire test should be performed within 90 seconds. The mutually vertical diameters $a_1$ and $a_2$ of the slumped concrete are measured parallel to the table edges and the average is formed.

Example 8

Differing to table 2 a mixture consisting of 12 parts of mixture A (see Table 1), 0.12 parts of the solution of coupling additive 14, 10 parts of quartz flour Millisil W3 (produced by Quarzwerke), 28 parts of gravel of grain size 0-3 mm, 50 parts of gravel of grain size 1-10 mm and 0.24 parts of the radical initiator Butanox M 50 (produced by Akzo Nobel Polymer Chemicals) is subjected to the slump test according to the above description. The determined slump is 19.9 cm.

Comparative Example 9

No Coupling Additive

A mixture consisting of 12 parts of mixture A (see Table 1), 10 parts of quartz flour Millisil W3 (produced by Quarzwerke), 28 parts of gravel of grain size 0-3 mm, 50 parts of gravel of grain size 1-10 mm and 0.24 parts of the radical initiator Butanox M 50 (produced by Akzo Nobel Polymer Chemicals) is subjected to the slump test according to the above description. The determined slump is 16.4 cm.

Comparative Example 10

Coupling with Low Molecular Weight

A mixture consisting of 12 parts of mixture A (see Table 1), 0.12 parts of 3-methacryloxyproyltrimethoxysilane, 10 parts of quartz flour Millisil W3 (produced by Quarzwerke), 28 parts of gravel of grain size 0-3 mm, 50 parts of gravel of grain size 1-10 mm and 0.24 parts of the radical initiator Butanox M 50 (produced by Akzo Nobel Polymer Chemicals) is subjected to the slump test according to the above description. The determined slump is 16.7 cm.

Example 9

Differing to table 2 a mixture consisting of 12 parts of mixture A (see Table 1), 0.24 parts of the solution of coupling additive 14, 10 parts of quartz flour Millisil W3 (produced by Quarzwerke), 28 parts of gravel of grain size 0-3 mm, 50 parts of gravel of grain size 1-10 mm and 0.24 parts of the radical initiator Butanox M 50 (produced by Akzo Nobel Polymer Chemicals) is subjected to the slump test according to the above description. The determined slump is 20.3 cm.

Comparative Example 11

Coupling Additive with Low Molecular Weight

A mixture consisting of 12 parts of mixture A (see Table 1), 0.24 parts of 3-methacryloxypropylmethoxysilane, 10 parts of quartz flour Millisil W3 (produced by Quarzwerke), 28 parts of gravel of grain size 0-3 mm, 50 parts of gravel of grain size 1-10 mm and 0.24 parts of the radical initiator Butanox M 50 (produced by Akzo Nobel Polymer Chemicals) is subjected to the slump test according to the above description. The determined slump is 16.8 cm.

The invention claimed is:

1. A curable polymer mixture comprising
   1) at least one at least oligomeric addition product a) of at least one aminosilane and/or thiosilane having at least one hydrolysable silane group and at least one compound having at least two terminal, ethylenically unsaturated double bonds as the only terminal groups, and/or at least one at least oligomeric addition product b) of at least one isocyanate silane and/or epoxy silane having at least one hydrolysable silane group and at least one oligomeric compound having at least three structural units and at least one terminal hydroxyl group or terminal amino group and at least one terminal ethylenically unsaturated double bond as coupling additive,
   2) a system which can be cured by radical polymerisation, comprising at least one ethylenically unsaturated polymer and/or a (meth)acrylic resin, at least one ethylenically unsaturated monomer, at least one radical initiator and optionally at least one cross-linking agent as binder system,
   3) at least 20% by weight, based on the total weight of components 1) to 4) of the polymer mixture, of inorganic, optionally multiparticulate, fillers as aggregates, and
   4) optionally conventional auxiliaries.

2. A curable polymer mixture according to claim 1, containing less than 5% by weight, based on the total weight of the components 1) to 4) of the polymer mixture, of the coupling additive as component 1).

3. A curable polymer mixture according to claim 2, wherein coupling additive 1) is present in a quantity of less than 0.5% by weight, based on the total weight of the components 1) to 4) of the polymer mixture.

4. A curable polymer mixture according to claim 1, wherein the compounds used for the preparation of addition product 1)a) and having at least two terminal ethylenically unsaturated double bonds are compounds with terminal (meth)acrylate groups and/or allyl groups, of which at least one terminal double bond is an acrylate group or methacrylate group,
   and the oligomeric compounds used for the preparation of addition product 1)b) and having at least one terminal double bond are compounds with at least one terminal acrylate, methacrylate or allyl group, and at least one terminal amino or terminal hydroxyl group.

5. A curable polymer mixture according to claim 1, wherein at least one oligomeric compound was used for the preparation of addition product a) as the compound having at least two terminal ethylenically unsaturated double bonds.

6. A curable polymer mixture according to claim 1, wherein a polymeric compound with at least one terminal hydroxyl-group or at least one terminal amino-group and at least one terminal ethylenically unsaturated double bond was used for the preparation of addition product b).

7. A curable polymer mixture according to claim 1, wherein a polyether, saturated polyester, polyamides, saturated polyester amides and/or saturated polyester polyethers was used as a compound having at least one or at least two terminal ethylenically unsaturated double bonds.

8. A curable polymer mixture according to claim 7, wherein the polyether, polyester or polyester polyether has at least two terminal ethylenically unsaturated double or at least one terminal, ethylenically unsaturated double bond and at least one terminal hydroxy or amino group.

9. A curable polymer mixture according to claim 7 wherein the polyether is at least a polyether selected from the group consisting of polyethylene oxides, polypropylene oxides, mixtures thereof, copolymers and block copolymers thereof, the polyester is at least a polyester selected from the group consisting of polyesters from diols and saturated dicarboxylic acids and polyesters from lactones.

10. A curable polymer mixture according to claim 1, wherein said compound having at least one hydrolysable silane group is a compound of the formula:

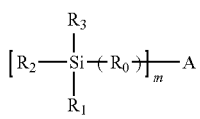

wherein

A represents an epoxide group, a glycidyloxy group, an isocyanate group, an —SH group, or an —N(H)—X group, wherein X represents hydrogen, an alkyl radical having 1 to 6 carbon atoms, an aryl radical having 6 to 10 carbon atoms or a cycloalkyl radical having 4 to 6 carbon atoms, and each of these X radicals can be substituted by a primary or secondary amino group, or A represents a —NH— group when m is the integer 2, $R_0$ represents an alkylene radical having 1 to 12 carbon atoms, a cycloalkylene radical having 4 to 6 carbon atoms or an arylene radical having 6 to 10 carbon atoms, $R_1$ represents an alkyl radical having 1 to 3 carbon atoms, a halogen, an —O—C(═O)—$R_4$ group or an —O$R_4$ group, wherein $R_4$ represents hydrogen or an alkyl radical having 1 to 3 carbon atoms, $R_2$ represents an alkyl radical having 1 to 3 carbon atoms, an —O—C(═O)—$R_4$ group, a halogen or an —O$R_4$ group, wherein $R_4$ represents hydrogen or an alkyl radical having 1 to 3 carbon atoms, $R_3$ represents an —O—C(═O)—$R_4$ group, a halogen or an —O$R_4$ group, wherein $R_4$ represents an alkyl radical having 1 to 3 carbon atoms, and m represents an integer 1 or 2.

11. A curable polymer mixture according to claim 10, wherein said compound having a hydrolyzable silane group is a compound selected from the group consisting of 3-aminopropyltrimethoxysilane, 3-aminopropylmethyldiethoxysilane, 3-aminopropyldimethylethoxysilane, 3-aminopropyltriethoxysilane, bis(trimethoxysilylpropyl)amine, 3-(aminoethyl)aminopropyltrimethoxysilane, 3-methylamino)propyltrimethoxysilane, 3-isocyanatopropyltrimethoxysilane, 3-isocyanatopropyltriethoxysilane, 3-mercaptopropyltrimethoxysilane, 3-mercaptopropylmethyldimethoxysilane and 3-mercaptopropyltriethoxysilane.

12. A curable polymer mixture according to claim 1, wherein the binder component 2) is present in a quantity of less than 80% by weight, based on the total weight of the components 1) to 4) of the polymer mixture.

13. A curable polymer mixture according to claim 12 wherein the binder component 2) is present in a quantity of less than 40% by weight based on the total weight of the components 1) to 4) of the polymer mixture.

14. A curable polymer mixture according to claim 1, wherein component 2) is a system of at least one ethylenically unsaturated polyester and at least one ethylenically unsaturated monomer and/or a system of a (meth)acrylate resin selected from the group comprising polyacrylic resins, poly(meth)acrylic resins, polyacrylic amide, poly(meth)acrylic amide and copolymers of (meth)acrylates and (meth)acrylic amides and at least one ethylenically unsaturated monomer, whereby each system comprises optionally at least one radical initiator and optionally at least one cross-linking agent.

15. A curable polymer mixture according to claim 14, wherein said at least one ethylenically unsaturated monomer is an optionally substituted styrene, alkyl(meth)acrylate and/or (meth)acrylamide.

16. A curable polymer mixture according to claim 14 wherein up to 55% by weight, based on the total weight of binder component 2), of ethylenically unsaturated monomers are present.

17. A curable polymer mixture according to claim 1, wherein the filler component 3) is present in a quantity of at least 60% be weight, based on the total weight of the components 1) to 4) of the polymer mixture.

18. A curable polymer mixture according to claim 1, wherein inorganic silicon-containing compounds, optionally in the form of grains of rock or cut fibers, and/or inorganic oxygen compounds of aluminum and/or magnesium are present as inorganic fillers.

19. A curable polymer mixture according to claim 1, wherein said conventional auxiliaries 4) are polymerization catalysts, accelerators, water trap compounds, inhibitors, pigments, wetting and dispersing agents, release agents, antifoam agents, stabilizers, antioxidants, light stabilizers, heat stabilizers, flameproofing agents, wetting agents, plasticizers, thickeners, thixotroping agents, impact strengthening agents, surface modifiers, antistatic agents and/or blowing agents.

20. A curable polymer mixture according to claim 1, wherein said mixture is a curable polymer concrete mixture.

21. A process for the preparation of a curable polymer mixture, wherein at least one coupling additive of claim 1 is mixed with a radically polymerizable system with multiparticulate, distributable, inorganic fillers as aggregates and optionally conventional auxiliaries.

22. A process for the production of a moulded article of a polymer mixture according to claim 21, wherein the polymer mixture is cured under polymerization and optionally forming.

23. A process for the production of a moulded article of a polymer concrete mixture according to claim 21 wherein the polymer concrete mixture is cured under polymerization and optionally formed.

24. A moulded article prepared by the process of claim 22.

25. The curable polymer mixture of claim 18, wherein said inorganic oxygen compounds of aluminum and/or magnesium are aluminum oxides, aluminium hydroxides, aluminium oxide hydroxides and/or magnesium hydroxides.

26. A moulded article prepared by the process of claim 23.

* * * * *